United States Patent

Bengs et al.

(10) Patent No.: US 6,723,429 B2
(45) Date of Patent: Apr. 20, 2004

(54) METHOD FOR PREPARING SMOOTH-SURFACE SPHERICAL MICROPARTICLES COMPLETELY OR PARTIALLY MADE OF AT LEAST ONE WATER-INSOLUBLE LINEAR POLYSACCHARIDE AND MICROPARTICLES PRODUCED ACCORDING TO THIS METHOD

(75) Inventors: Holger Bengs, Frankfurt am Main (DE); Jürgen Grande, Bad Soden (DE); Silke Schuth, Ruppach-Goldhausen (DE); Gitte Böhm, Frankfurt am Main (DE); Arnold Schneller, Messel (DE); Anette Brunner, Roth (DE)

(73) Assignee: Celanese Ventures GmbH, Frankfurt am Main (DE)

( * ) Notice: Subject to any disclaimer, the term of this patent is extended or adjusted under 35 U.S.C. 154(b) by 414 days.

(21) Appl. No.: 09/795,562

(22) Filed: Feb. 28, 2001

(65) Prior Publication Data

US 2001/0051716 A1 Dec. 13, 2001

Related U.S. Application Data

(63) Continuation of application No. PCT/EP99/05929, filed on Aug. 13, 1999.

(30) Foreign Application Priority Data

Aug. 28, 1998 (DE) .......................... 198 39 214

(51) Int. Cl.[7] .............................. B32B 5/16; C07H 3/00; C13K 1/06

(52) U.S. Cl. ...................... 428/402; 424/488; 424/489; 536/123.1; 536/123.12

(58) Field of Search ...................... 428/402; 536/123.1, 536/123.12; 424/488, 489

(56) References Cited

U.S. PATENT DOCUMENTS

| | | | | |
|---|---|---|---|---|
| 5,350,524 A | * | 9/1994 | Besnard et al. | 210/728 |
| 5,618,562 A | * | 4/1997 | Saito et al. | 424/489 |
| 5,624,612 A | | 4/1997 | Sewall et al. | 264/4.1 |
| 5,635,609 A | * | 6/1997 | Levy et al. | 536/2 |
| 5,637,197 A | | 6/1997 | Watt et al. | 162/202 |
| 5,688,775 A | * | 11/1997 | Renn et al. | 514/54 |
| 6,143,211 A | * | 11/2000 | Mathiowitz et al. | 264/4 |
| 6,238,677 B1 | * | 5/2001 | Fanta et al. | 424/400 |
| 6,495,488 B2 | * | 12/2002 | Yamaguchi et al. | 502/238 |
| 6,562,459 B1 | * | 5/2003 | Bengs et al. | 428/402 |
| 6,592,897 B1 | * | 7/2003 | Bengs et al. | 424/468 |
| 6,593,470 B1 | * | 7/2003 | Bengs et al. | 536/123.12 |
| 6,607,784 B2 | * | 8/2003 | Kipp et al. | 427/213.3 |

FOREIGN PATENT DOCUMENTS

| | | |
|---|---|---|
| EP | 0 328 317 A1 | 8/1989 |
| EP | 0 394 731 A1 | 10/1990 |

OTHER PUBLICATIONS

International Search Report in PCT/EP99/05929 dated Jan. 13, 2000.
International Preliminary Examination Report in PCT/EP99/05929 dated Dec. 14, 2000.

* cited by examiner

*Primary Examiner*—H. Thi Le
(74) *Attorney, Agent, or Firm*—Marshall, Gerstein & Borun

(57) ABSTRACT

The present invention relates to a method for preparing smooth-surface spherical microparticles which are completely or partially made of at least one water-insoluble linear polysaccharide. This method involves dissolving the at least one water-insoluble linear polysaccharide in a solvent or a mixture of solvents, introducing the solution into a precipitation agent or a mixture of precipitation agents, optionally cooling the mixture thus obtained, and separating the microparticles thus formed. The precipitation agent used consists of at least one water-soluble cellulose derivative. This invention also relates to microparticles obtained according to this method.

26 Claims, 3 Drawing Sheets

3 μm

1 μm

3 μm

1 μm

METHOD FOR PREPARING SMOOTH-SURFACE SPHERICAL MICROPARTICLES COMPLETELY OR PARTIALLY MADE OF AT LEAST ONE WATER-INSOLUBLE LINEAR POLYSACCHARIDE AND MICROPARTICLES PRODUCED ACCORDING TO THIS METHOD

This is a continuation of International Application No. PCT/EP99/05929 filed Aug. 13, 1999, published as WO 00/12617 Mar. 9, 2000, the entire disclosure of which is incorporated herein by reference.

A method for preparing spherical microparticles which have a smooth surface and consist entirely or partly of at least one water-insoluble linear polysaccharide, and microparticles obtainable by said method The present invention relates to a method for preparing spherical microparticles which have a smooth surface and consist entirely or partly of at least one water-insoluble linear polysaccharide, and microparticles obtainable by said method.

The applicant's German patent application No. 19737481.6 describes methods for preparing spherical microparticles containing water-insoluble linear polysaccharides. This method can produce, in a simple and inexpensive manner, spherical microparticles which stand out in particular due to high uniformity with respect to their shape and their diameter distribution and also due to good mechanical properties Owing to their comparatively uniform constitution and with simultaneously good mechanical properties, these microparticles may be employed for a multiplicity of applications.

It has, however, become apparent that, depending on the intended application, a specific modification of the particle characteristics may be advantageous.

Thus it may be desirable to prepare such microparticles with a particularly smooth surface. Microparticles with smooth surfaces are particularly suitable, for example, for the application in separation methods, for example chromatography, for which a comparatively high bulk density is advantageous, or if a particular smoothing effect is to be achieved, for example for cosmetic purposes.

It is therefore an object of the present invention to provide a method which can be used for reproducibly producing in a simple manner spherical microparticles containing water-insoluble linear polysaccharides and which have, aside from a regular shape, uniform diameter distribution and also good mechanical properties, a smooth surface.

In this respect, the present invention is an advantageous inventive development of the abovementioned German patent application No. 19737481.6.

This object is achieved by a method for preparing spherical microparticles which have a smooth surface and consist entirely or partly of at least one water-insoluble linear polysaccharide by dissolving the at least one water-insoluble linear polysaccharide in a solvent or solvent mixture, introducing the solution formed into a precipitant or precipitant mixture, where appropriate cooling the mixture being produced in the process and removing the microparticles formed, wherein at least one water-soluble cellulose derivative is used as a precipitation aid.

The present invention further relates to spherical microparticles which have a smooth surface and consist entirely or partly of at least one water-insoluble linear polysaccharide, wherein the depth of irregularities on the microparticle surface is not more than 10% of the average diameter of the microparticle.

BRIEF DESCRIPTION OF THE DRAWINGS

FIG. 1: particles of the invention according to Example 2, magnification 5000×,

FIG. 2: particles as in FIG. 1, magnification 10000×,

FIG. 3: particles of the invention according to Example 4, magnification 5000×,

FIG. 4: particles of the invention according to FIG. 3, magnification 20000×,

FIG. 5: particles of the invention according to Example 5, magnification 5000×, and FIG. 6: particles according to FIG. 5, magnification 20000×.

Figure 1:
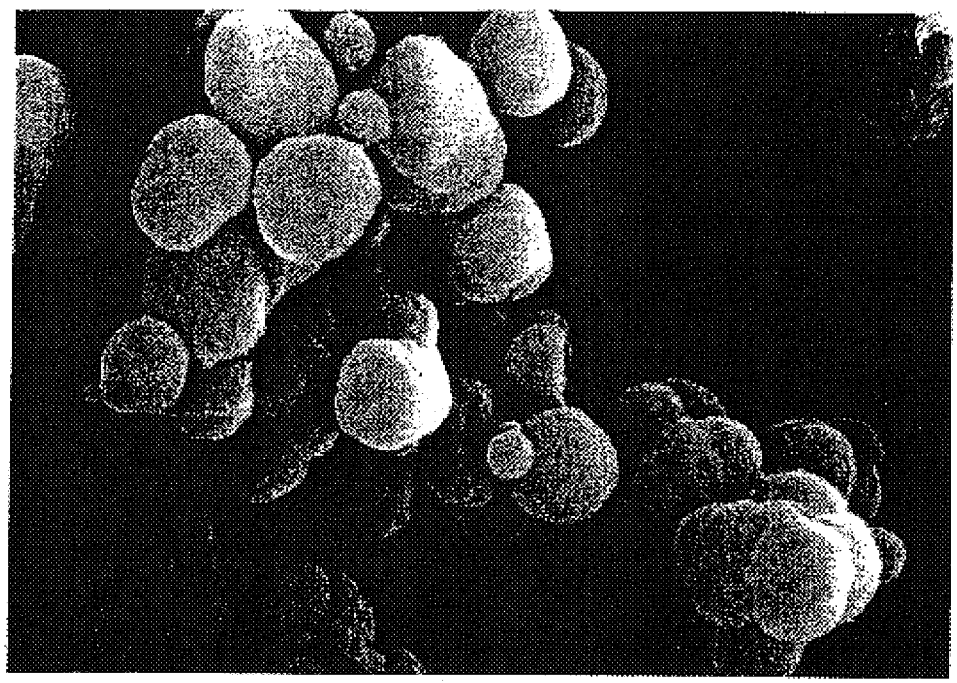
FIGS. 1 to 6 show scanning electron micrographs (SEM, Camscan S-4) of spherical particles.

For the purposes of the present invention, the contents of German patent application No. 19737481.6 are explicitly referred to.

Although said application also discusses the use of precipitation aids, there is no information on the use of water-soluble cellulose derivatives, in particular no information on using such compounds in order to specifically control the surface characteristics of the microparticles.

Although U.S. Pat. No. 5,624,612 describes the use of water-soluble cellulose derivatives for modifying microparticles composed of polysaccharides, the cellulose derivatives are not employed in this case as precipitation aids, but serve to coating microparticles in order to increase their rehydrogenation capability, and, in addition, the microparticles described do not consist of water-insoluble linear polysaccharides used according to the invention.

It is in principle possible to use any water-soluble cellulose derivative for the process according to the invention, as long as it is suitable as a precipitation aid. The celluloses in this case may be chemically modified celluloses of any kind. They are in particular celluloses chemically modified by polymer-analogous reactions as described, for example, in "Römpps Chemie Lexikon [Römpp's Dictionary of Chemistry], 9th edition, Georg Thieme Verlag, Stuttgart, New York, 1995.

Examples are cellulose esters and cellulose ethers and mixed forms thereof. Specific representatives are, for example, hydroxypropylmethylcelluloses, hydroxyethylcelluloses, carboxymethylcelluloses, cellulose acetates, cellulose butyrates, cellulose propionates, cellulose acetobutyrates, cellulose acetopropionates, cellulose nitrates, ethylcelluloses, benzylcelluloses, methylcelluloses.

Mixtures of different water-soluble cellulose derivatives may also be employed.

For the present invention, the term "water-soluble cellulose derivatives" means compounds classified as very soluble to slightly soluble according to the definition of the Deutsches Arzneimittelbuch [German Pharmacopeia] (DAB=Deutsches Arzneimittelbuch, Wissenschaftliche Verlagsgesellschaft mbH, Stuttgart, Govi-Verlag GmH, Frankfurt, 9th edition, 1987).

The concentration of the water-soluble cellulose derivative in the precipitant is not particularly critical. The upper limit is inevitably determined by the resulting viscosity and thus the workability of the solution being produced.

Concentrations proven to be advantageous are from 2 g (cellulose derivative)/l (precipitant) to 150 g/l, and preferably from 5 g/l to 80 g/l and in particular 8 g/l to 20 g/l.

Linear water-insoluble polysaccharides in accordance with the present invention are polysaccharides composed of monosaccharides, disaccharides or other monomeric components such that the individual components are always linked to each other in the same way. Each base unit or component defined in this way has exactly two linkages, each one to another monomer. The only exceptions are the two base units forming the start and the end of the polysaccharide which have only one linkage to another monomer.

Examples of preferred water-insoluble linear polysaccharides are linear poly-D-glucans in which the type of linkage is unimportant, as long as linearity in accordance with the invention is present. Examples are poly(1,4-alpha-D-glucan) and poly(1,3-beta-D-glucan), poly(1,4-alpha-D-glucan) being particularly preferred.

If the base unit has three or more linkages, then this is referred to as branching. The number of hydroxyl groups per 100 base units, which are not involved in constructing the linear polymer backbone and which form branchings, constitutes the so-called degree of branching.

According to the invention, the linear water-insoluble polysaccharides have a degree of branching of less than 8%, i.e. less than 8 branchings per 100 base units. The degree of branching is preferably less than 4% and in particular not more than 1.5%.

If the water-insoluble linear polysaccharide is a polyglucan, for example poly(1,4-alpha-D-glucan), then the degree of branching at position 6 is less than 4%, preferably not more than 2% and in particular not more than 0.5%, and the degree of branching at the other positions not involved in the linear linkages, for example at positions 2 and 3 in the case of the preferred poly(1,4-alpha-D-glucan), is preferably not more than 2% and in particular not more than 1%.

Particular preference is given to polysaccharides, in particular poly-alpha-D-glucans, which have no branchings or whose degree of branching is so minimal as to be undetectable by conventional methods. According to the invention, the prefixes "alpha", "beta" or "D" refer solely to the linkages forming the polymer backbone and not to the branchings.

For the present invention, the term "water-insoluble polysaccharides" means compounds which according to the definition of the Deutsches Arzneimittelbuch [German Pharmacopeia] are classified as "sparingly soluble", "slightly soluble", "very slightly soluble" and "practically insoluble", corresponding to classes 4 to 7.

For the present invention, preference is given to from slightly soluble to practically insoluble compounds, in particular to from very slightly soluble to practically insoluble compounds.

In the case of the polysaccharides used according to the invention, this means that preferably at least 98% of the amount employed, in particular at least 99.5%, are insoluble in water (corresponding to classes 4 and 5, respectively) under standard conditions (T=25° C. +/−20%, p=101 325 Pascal+/−20%).

The following protocol may illustrate "very slightly soluble", corresponding to class 6:

One gram of the polyglucan/polysaccharide to be studied is heated to 130° C. in 1 l of deionized water at a pressure of 1 bar. The solution forming remains stable only briefly for a few minutes. During cooling under standard conditions, the substance precipitates again. After cooling to room temperature and separation by means of centrifugation, at least 66% of the amount employed can be recovered, taking into account experimental losses.

The polysaccharides employed according to the invention may be of any origin, as long as the abovementioned conditions with respect to the terms "linear" and "water-insoluble" are met.

They may have been obtained naturally or via biotechnology.

They may be produced, for example, from natural plant or animal sources by isolation and purification.

It is also possible to use sources which have been genetically manipulated such that they contain a higher proportion of unbranched or comparatively slightly branched polysaccharides than the unmanipulated source.

They may have been prepared from non-linear polysaccharides by enzymatic or chemical debranching.

Biotechnological methods comprise biocatalytic, also biotransformation, or fermentation processes.

WO 95/31553, for example, describes an advantageous method for the biotechnological production.

Modified water-insoluble linear polysaccharides may also be used, it being possible for the polysaccharides to have been chemically modified, for example by esterification and/or etherification at one or more of the positions not involved in the linear linkage. In the case of the preferred 1,4-linked polyglucans, modification may take place at positions 2, 3 and/or 6. Measures for such modifications are well known to the skilled worker.

Thus linear polysaccharides such as pullulans, pectins, mannans or polyfructans, which are water-soluble or swellable per se, can be made water-insoluble through modification.

It is further possible to use so-called alpha-amylase-resistant polysaccharides as described, for example, in the German patent application No. 198 30 618.0.

Further examples for suitable water-insoluble linear polysaccharides and also a detailed explanation with respect to the preparation methods thereof are to be found in the German applications of the same applicant, Nos. 197 37 481.6, 198 03 415.6, 198 16 070.4, 198 30 618.0 and 198 27 978.7 which have earlier priority but are not prior publications and which are explicitly referred to here.

The molecular weights $M_w$ (weight average, determined by means of gel permeation chromatography in comparison with a calibration using a pullulan standard) of the linear polysaccharides used according to the invention may vary within a wide range from $10^3$ g/mol to $10^7$ g/mol. The molecular weight $M_w$ is preferably in the range from $10^4$ g/mol to $10^5$ g/mol and particularly preferably from $2\times10^4$ g/mol to $5\times10$ g/mol. Another advantageous range is from $2\times10^3$ g/mol to $8\times10^3$ g/mol. Corresponding ranges apply to the preferably used poly-D-glucan and poly(1,4-alpha-glucan).

The molecular weight distribution or polydispersity $M_w/M_n$ may likewise vary widely, depending on the polysaccharide preparation method. Preferred ranges are from 1.01 to 50, and in particular from 1.5 to 15. Polydispersity increases with a bimodal molecular weight distribution.

For the method of the invention, a single linear polysaccharide substance, in particular linear poly-D-glucan, preferably poly(1,4-alpha-glucan), or mixtures of two or more representatives may be used.

According to a further embodiment, a water-insoluble branched polysaccharide, preferably a polyglucan, in particular a poly(1,4-alpha-D-glucan) or a poly(1,3-beta-D-glucan) may be added.

In this context, the degree of branching is negligible. The proportion of branched polysaccharide, however, should not exceed 30% by weight, preferably 20% by weight and in particular 10% by weight, with respect to the total amount of water-insoluble polysaccharide.

It is also possible to add mixtures of two or more branched polysaccharides.

The branched polysaccharides may be of any origin. In this connection, the explanations on this matter for the linear polysaccharides are referred to. Preferred sources are starch and starch analogs such as glycogen. If required, suitable concentration methods may increase the proportion of linear structures in the branched polysaccharides.

Regarding water-insolubility and essentially also molecular weight, the same information applies as for the linear polysaccharide, but the molecular weight of the branched polysaccharides may be higher than indicated for the water-insoluble linear polysaccharides.

It is also possible to admix other polymers, in particular other biocompatible or biodegradable polymers. The amount of the other polymer(s) which is (are) admixed without changing the spherical shape and/or other properties of the microparticles to be prepared, always depends on the polymer added. The amount may be up to 10% by weight or more, with respect to the total amount of water-insoluble linear polysaccharide employed, and, where appropriate, branched polysaccharide employed, also less in particular cases. The maximum amount allowed depends on the particular individual case and can be readily determined by a skilled worker through standard experiments.

Examples of suitable solvents for dissolving starting materials such as linear polysaccharides are dimethyl sulfoxide (DMSO), formamide, acetamide, N,N-dimethylformamide, N,N-dimethylacetamide, N-methylmorpholine N-oxide in the presence of water, further N-substituted morpholine N-oxides, aqueous solutions with high or low pH, or -mixtures of the abovementioned solvents, DMSO being particularly preferred. It is also possible, of course, to use other solvents familiar to the skilled worker for this purpose.

The concentration of linear polysaccharide in the solvent may vary within wide limits according to demand. It is preferably in a range from 0.02 g (polysaccharide)/ml (solvent) to 1.0 g/ml, in particular from 0.05 g/ml to 0.8 g/ml and particularly preferably from 0.3 g/l to 0.6 g/l.

Examples of precipitants are water, dichloromethane, a mixture of water and dichloromethane, mixtures of water and alcohols such as methanol, ethanol, isopropanol, with water and also a mixture of water and dichloromethane being particularly preferred.

The solvent/precipitant ratio is preferably in a range from 1:1000 to 1:4 (part of solvent/parts of precipitant), preferably 1:100 to 1:10 and in particular 1:70 to 1:30.

According to a preferred embodiment, the solution containing the polysaccharide is combined with the precipitant containing the aqueous cellulose derivative at from 20° C. to 50° C.

If mixing takes place at an elevated temperature, then the mixture being produced may subsequently be cooled, if required.

The order in which solvent and precipitant are combined, for example whether the precipitant is added to the solvent or vice versa, is unimportant. It is, however, important to ensure rapid mixing.

The temperature during the precipitation process is generally maintained at from plus 10° C. to minus 10° C., preferably plus 5° C. and minus 5° C. A higher or lower temperature may also be chosen, if required.

The precipitation process may be carried out relatively slowly at low temperature overnight. It can be influenced and controlled by varying the temperature and the precipitant. If the mixture of solvent and precipitant is cooled, it must be ensured that said mixture stays liquid and does not solidify.

Furthermore, addition of other precipitation aids in addition to the aqueous cellulose derivatives that are required for the invention may affect process control and also microparticle properties such as size for example.

Examples of suitable additives are surfactants such as sodium dodecyl sulfate, N-methylgluconamide, polysorbates (e.g. Tween (registered trademark)), alkyl polyglycol ethers, ethylene oxide/propylene oxide copolymers (e.g. Pluronic (registered trademark)), alkyl polyglycol ether sulfates, generally alkyl sulfates and glycol fatty esters, and sugars such as, for example, fructose, sucrose and glucose. The surfactants may be anionic, cationic or nonionic.

Usually, the aids including the aqueous cellulose derivative are added to the precipitant. The amount used depends on the particular individual case and also on the desired particle properties, and the skilled worker is familiar with determining the advantageous amount for each case.

Interestingly, it has turned out that the proportion of particularly small particles can be increased when adding hot-water-soluble poly-alpha-D-glucan to the precipitant.

For this, the same poly-alpha-D-glucan compounds may be employed as those mentioned in connection with linear polysaccharides, as long as they meet -the hot-water-solubility requirement.

Preferred examples are native or chemically modified starches, poly-alpha-D-glucans obtained from said starches, and also starch-like compounds.

Starch-like compounds mean compounds which comprise poly-alpha-D-glucans but which are not from plants. Examples are glycogen and dextran.

The hot-water-soluble poly-alpha-D-glucans may be employed as a mixture of a linear and a branched proportion, as in starch, for example. In this case, the proportion of linear poly-alpha-D-glucan should be greater than 15% by weight, preferably 50 to 99.5%, in particular 60 to 90% and very particularly preferably 65 to 80%, with respect to the total amount of poly-alpha-D-glucan in the precipitant.

They may, however, also comprise branched structures, as in amylopectin or in glycogen, for example.

In the context of the present invention, "hot-water-soluble" means that the poly-alpha-D-glucans are essentially insoluble at room temperature, with the same standard being applied as for the term "water-insoluble" in connection with linear polysaccharides. The term "solution" or "solubility" means in particular also suspensions or the formation of suspensions like those appearing when dissolving starch.

For example, the hot-water-soluble starches preferred according to the invention have negligible solubility in water at room temperature, while the so-called cold-water-soluble starches are more freely soluble under these conditions.

Hot-water-soluble starches are characterized in particular by forming solutions when heated under autogeneous pressure, for example in an autoclave, to a temperature in the range from about 100 to about 160° C., the particular temperature depending on the type of starch.

It is, for example, possible to dissolve potato starch completely at about 100° C., while maize starch requires approx. 125° C.

For the method of the invention, the hot-water-soluble poly-alpha-D-glucans are preferably added at maximum concentration to the precipitant, i.e. a saturated solution is prepared.

Further suitable ranges are from greater than 0.001% by weight to 10% by weight, preferably from 0.01 to 2% by weight, and in particular from 0.05% by weight to 0.5% by weight, with respect to the amount of precipitant used.

The spherical microparticles which are obtainable according to the method of the invention and which this invention likewise relates to, have a particularly smooth surface, in addition to advantages such as a uniform spherical shape, narrow size distribution and good mechanical properties, which are already described in the German patent application No. 19737481.6.

A smooth surface in accordance with the invention means that the depth of irregularities on the particle surface, such as recesses or indentations, is not more than 10%, preferably 5%, of the average diameter of the spherical microparticles.

The particles may have average diameters dn (number average) of from 100 nm to 10 µm, preferably 800 nm to 8 µm and particularly preferably 1 µm to 4 µm.

Spherical means in accordance with the invention that the microparticles have nearly a spherical shape. If a sphere is described by axes of identical length which start from a common origin, are directed into space and define the radius of the sphere in all spatial orientations, the length of the axes may deviate from an ideal spherical state by from 1% to 40% for the spherical microparticles. Preferably, spherical microparticles with deviations of up to 25% are obtained, particularly preferably up to 15%.

Furthermore, the microparticles of the invention preferably show a dispersity D=weight average diameter(dw)/number average diameter(dn) of from 1.0 to 50.0, preferably from 1.5 to 20.0 and in particular from 2.0 to 10.0.

The averages used herein are defined as follows:

$d_n$=sum $n_i \times d_i$/sum $n_i$=number average $d_w$=sum $n_i \times d_i^2$/sum $n_i \times d_i$=weight average $n_i$=number of particles with diameter $d_i$, $d_i$=a particular diameter, i=serial parameter.

The term weight in this connection represents a weighted average. The larger diameters are given greater importance.

Owing to their smooth surface, it is possible to achieve specific smoothing effects using the microparticles of the invention; in addition, said microparticles are suitable in particular also for separation methods such as, for example, chromatography.

The use of generic microparticles for separation methods is described in detail in the German patent application No. 19816070.4 of the same applicant, which has earlier priority but is not a prior publication and which is in its entirety referred to here.

It goes without saying that the particles of the invention are also suitable for all further applications as listed in the German patent application No. 19737481.6.

Thus, they can be employed in pure form or as vehicles for active substances in the widest sense, for example

- as additives for cosmetics in ointments, dusting powders, creams, pastes,
- as vehicles for active substances in pharmaceutical, animal experimental and other similar applications,
- as smoothing agents, for example for closing pores or smoothing flashes,
- as food additive, for example as bulking component or for improving Theological properties,
- as additive for upgrading, for example, emulsion polymers,
- as separation aids, for example in the removal of impurities,
- as encapsulating material,
- as vehicles for magnetic particles for example,
- as filler, in particular for biodegradable polymers or industrial polymers, for example for controlling properties,
- as additive for controlling properties, for example the porosity, the weight, the color,
- as particle standard for calibration or determination of the particle size of unknown materials,
- as vehicle material for the controlled, e.g. slow, release of active substances,
- as bulking agent for improving the properties of industrial or biocompatible polymers,
- in diagnostic tests, for example as ultrasound agent.

Owing to their natural origin, most of the water-insoluble linear polysaccharides used according to the invention and of the degradation products thereof, in particular polyglucans such as poly(1,4-alpha-D-glucan), are biocompatible and biodegradable. They are well tolerated in tissues and do not accumulate in the animal, in particular human, body.

Biodegradation means in this context any in vivo process leading to degradation or destruction of substances, in this case polysaccharides.

These properties of biocompatibility and biodegradability are particularly advantageous for uses concerning human or animal organisms, for example in medicine, pharmacy or cosmetics.

The following examples explain the invention in more detail.

EXAMPLES 1 and 2

1.0 g of poly(1,4-alpha-D-glucan) is in each case dissolved in 5 ml of dimethyl sulfoxide (DMSO, analytical grade, from Riedel-de-Haen) at 60° C. Hydroxypropylmethylcellulose (HPMC, E5Prem. from Dow Chemicals) at the concentrations indicated in Table 1 is dissolved in 100 ml of double-distilled water. The DMSO solution containing the polyglucan is added dropwise at room temperature and with stirring to the 100 ml of HPMC solution within a few seconds. The mixture obtained is stored at 5° C. for 16 hours. A fine white precipitate of microparticles develops in the form of a milk-like suspension. The particles are removed by homogeneously suspending the whole mixture and subsequent centrifugation at 3000 revolutions per minute for 10 to 15 minutes (Labofuge GL from Heraeus). The solid residue is resuspended in double-distilled water three times in total and again centrifuged.

The solid obtained is resuspended in approx. 5 to 10 ml of double-distilled water, frozen and lyophilized (Christ Delta 1-24 KD freeze-dryer).

The results are listed in the following Table 1.

TABLE 1

|  | HPMC concentration (%) | Yield (%) |
|---|---|---|
| Example 1 | 1.0 | 49 |
| Example 2 | 10.0 | 30 |

EXAMPLE 3

Characterization of the microparticles prepared in Examples 1 and 2

Figure 2:
Figure 3:
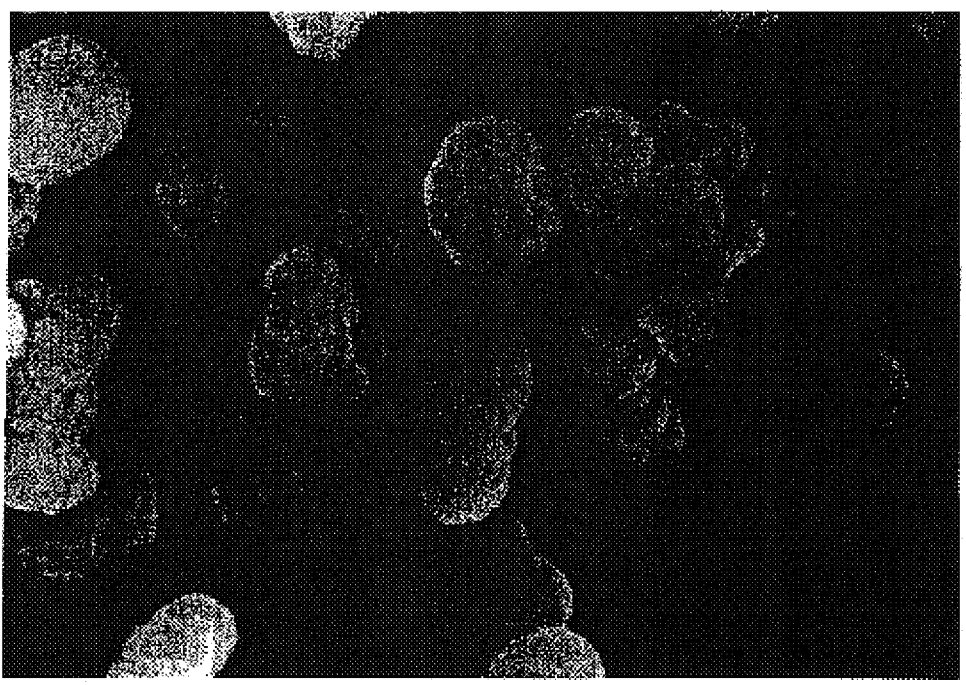
Figure 4:
Figure 5:
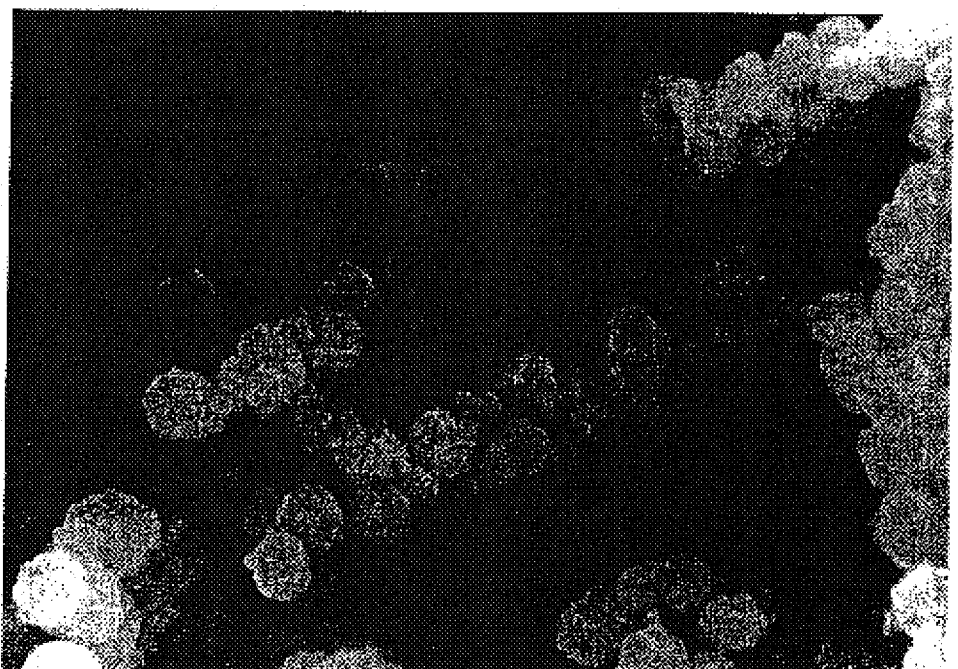
Figure 6:

Characterization of the particles was carried out on the basis of scanning electron micrographs (SEM, Camscan S-4), as shown in FIGS. 1 and 2.

The results are listed in the following Table 2.

TABLE 2

|  | Example 1 | Example 2 |
| --- | --- | --- |
| Size | 1.0–3.0 μm | 1.0–3.0 μm |
| Shape | spherical | 3 nearly spherical |
| Surface characteristics | smooth | smooth |

EXAMPLES 4 and 5

Influence of the molecular weight of the cellulose derivative on particle characteristics The experiments were essentially carried out in analogy to Examples 1 and 2, with the exception that HPMC of different molecular weights was used of which E5Prem has a lower molecular weight and thus a lower viscosity than K15Prem (likewise from Dow Chemical).

The particles obtained are of identical quality as the results and FIGS. 3 to 6 show. Consequently, the influence of the molecular weight of the cellulose derivative employed on the particle characteristics is negligible.

The results are summarized in the following Table 3

TABLE 3

|  | Example 4 | Example 5 |
| --- | --- | --- |
| HPMC (%) | E5Prem | K15Prem |
| Concentration | 1.0 | 1.0 |
| Yield | 49 | 45 |
| Size | 1.0–3.0 μm | 1.0–3.0 μm |
| Shape | spherical | spherical |
| Surface characteristics | nearly smooth | nearly smooth |

EXAMPLE 6

Determination of the solubility of polysaccharides and classification to the Deutsches Arzneimittelbuch [German Pharmacopeia] (DAB)

564 mg of poly(1,4-alpha-D-glucan) in about 0.5 l of double-distilled water were heated in an autoclave (Certoclav apparatus) at 130° C. and 1.3 bar for 1.5 hours. The weight of the autoclave had been determined before.

The pressure in the apparatus was then reduced and the apparatus was cooled at room temperature. The contents were weighed and corresponded to 501.74 g.

After a further 24 hours, the solution was centrifuged and decanted. The solid residue obtained was dried and weighed. From the result of 468 mg a dissolved proportion of 96 mg was calculated.

With respect to the amount of solvent employed, it follows that 5226 mg of water are required to dissolve 1 mg of poly(1,4-alpha-D-glucan). According to the classification of the DAB this substance is thus classified as "very slightly soluble". This class includes according to the DAB all substances which require between 1000 and 10000 parts of solvent in order to dissolve 1 part of the substance.

Of the 7 classes, into which solubility is divided according to the DAB, said class is class 6, with classification ranging from class 1 "very soluble" to class 7 "practically insoluble".

What is claimed is:

1. A method for preparing spherical microparticles which have a smooth surface wherein the depth of irregularities on the particle surface is not more than 10% of the average diameter of the particle, and which comprise at least one water-insoluble linear polysaccharide, said method comprising the steps of
   (a) dissloving the at least one water-insoluble polysaccharide in a solvent or solvent mixture to form a solution,
   (b) introducing the solution into a precipitant or precipitant mixture to produce a polysaccharide-precipitant mixture and, where appropriate, cooling the polysaccharide-precipitant mixture, to produce microparticles, and
   (c) removing the microparticles,
   wherein at least one water-soluble cellulose derivative is used as a precipitation aid.

2. The method as claimed in claim 1, wherein the cellulose derivative is a cellulose ester or cellulose ether.

3. The method as claimed in claim 1, wherein the water-soluble cellulose derivative is selected from the group consisting of hydroxypropylmethylcelluloses, hydroxyethylcelluloses, carboxymethylcelluloses, cellulose propionates, cellulose butyrates, cellulose acetates, cellulose acetobutyrates, cellulose acetopropionates, cellulose nitrates, ethylcelluloses, benzylcelluloses, and methylcelluloses.

4. The method as claimed in claim 1, which comprises mixing the solution and the precipitant at from 20 to 50° C. and cooling the polysaccharide-precipitant mixture to from plus 10° C. to minus 10° C.

5. The method as claimed in claim 4, which comprises cooling the polysaccharide-precipitant mixture to from plus 5° C. to minus 5° C.

6. A method as claimed in claim 1, wherein the precipitant is water or another aqueous medium.

7. The method as claimed in claim 1, wherein the solvent is dimethyl sulfoxide.

8. The method as claimed in claim 1, wherein the water-insoluble linear polysaccharide is a linear polyglucan.

9. The method as claimed in claim 8, wherein the polyglucan is poly(1,4-alpha-D-glucan).

10. The method as claimed in claim 8, wherein the polyglucan is poly(1,3-beta-D-glucan).

11. The method as claimed in claim 1, wherein the water-insoluble linear polysaccharide is a chemically modified polysaccharide.

12. The method as claimed in claim 11, wherein the polysaccharide has been esterified and/or etherified at at least one of the positions not involved in the formation of the polymer chain.

13. The method as described in claim 12, wherein the water-insoluble linear polysaccharide has been esterified and/or etherified at at least one of positions 2, 3, and 6.

14. The method as claimed in claim 1, wherein in addition to the water-insoluble linear polysaccharide a water-insoluble branched polysaccharide is present at not more than 30% by weight, with respect to the total amount of water-insoluble polysaccharide.

15. The method as claimed in claim 14, wherein the water-insoluble branched polysaccharide is a polyglucan.

16. The method as claimed in claim 15, wherein the polyglucan is a branched poly(1,4-alpha-D-glucan).

17. A spherical microparticle which has a smooth surface and comprises at least one water-insoluble linear polysaccharide, wherein the depth of irregularities on the particle surface is not more than 10% of the average diameter of the particle.

18. The spherical microparticle as claimed in claim 17, wherein the depth of the irregularities on the particle surface is not more than 5%, of the average diameter of the particle.

19. The spherical microparticle as claimed in claim 17, wherein the microparticle has a dispersity D in the range from 1.0 to 10.0.

20. The spherical microparticle as claimed in claim 17, wherein the microparticle has an average diameter in the range from 100 nm to 10 μm.

21. The spherical microparticle as claimed in claim 17, wherein in addition to the water-insoluble linear polysaccharide a water-insoluble branched polysaccharide is present at not more than 30% by weight, with respect to the total amount of water-insoluble polysaccharide.

22. The spherical microparticle as claimed in claim 21, wherein the water-insoluble branched polysaccharide is a polyglucan.

23. The spherical microparticle as claimed in claim 22, wherein the polyglucan is a branched poly(1,4-alpha-D-glucan).

24. The use of spherical microparticles as claimed in claim 17 for separating mixtures of substances.

25. The use of spherical microparticles as claimed in claim 17 as filler in polymers.

26. The use of spherical microparticles as claimed in claim 17 in diagnostic tests.

* * * * *